United States Patent [19]
An et al.

[11] Patent Number: 5,851,411
[45] Date of Patent: Dec. 22, 1998

[54] HIGH-DENSITY LIQUID CRYSTAL DISPLAY AND METHOD

[75] Inventors: Sang-Sik An; Sang-Ho Lee; Dong-Hyo Gu, all of Kyungki-do; Min-Choel Shin, Incheon-si, all of Rep. of Korea

[73] Assignee: LG Electronics, Inc., Seoul, Rep. of Korea

[21] Appl. No.: 742,913

[22] Filed: Nov. 1, 1996

[30] Foreign Application Priority Data

Jul. 9, 1996 [KR] Rep. of Korea .................. 96-27652

[51] Int. Cl.$^6$ .................................................. G02F 1/1333
[52] U.S. Cl. ................... 216/23; 216/52; 216/53
[58] Field of Search ................... 216/23, 49, 51, 216/52, 53, 65; 349/73

[56] References Cited

U.S. PATENT DOCUMENTS

| | | | |
|---|---|---|---|
| 4,832,457 | 5/1989 | Saitoh et al. ........................ | 350/334 |
| 5,056,893 | 10/1991 | Holz et al. ........................... | 359/54 |
| 5,661,531 | 8/1997 | Greene et al. ....................... | 349/73 |

*Primary Examiner*—R. Bruce Breneman
*Assistant Examiner*—Anita Alanko
*Attorney, Agent, or Firm*—Morgan, Lewis & Bockius LLP

[57] ABSTRACT

A method for manufacturing a display, which includes first and second substrates, each having an inner light shielding region and an edge light shielding region, includes the steps of defining the edge light shielding region into a first portion and a second portion, and defining an area of the first substrate. The area includes the first portion of the edge light shielding region. The area including the first portion of the edge light shielding region is removed and leaves the second portion of the edge light shielding region. The first and second substrates are combined at the second portion of the edge light shielding region.

26 Claims, 17 Drawing Sheets

FIG. IA PRIOR ART
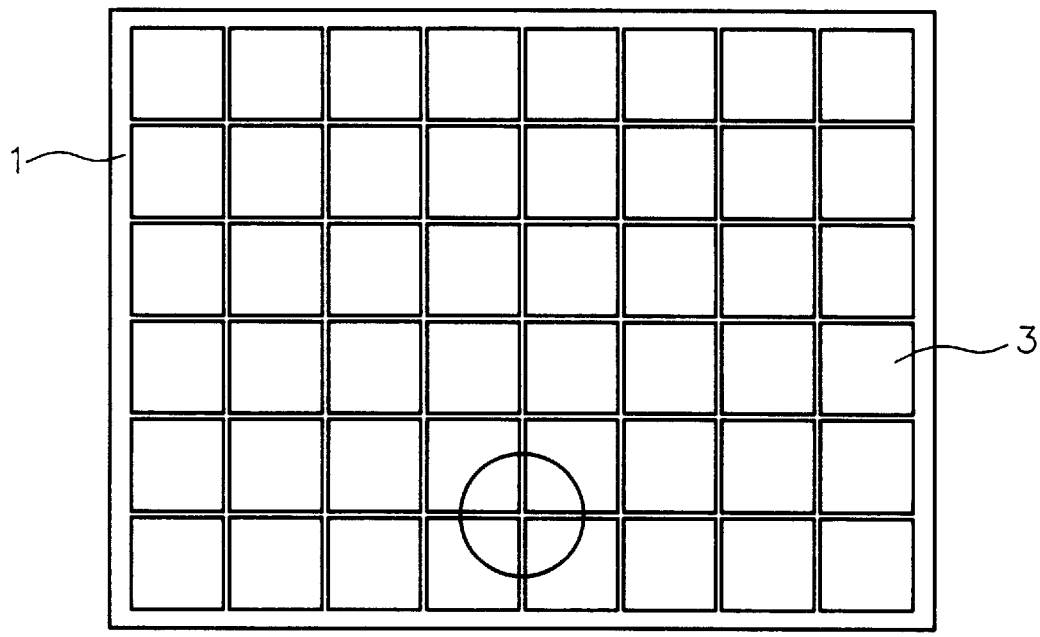
FIG. IB PRIOR ART
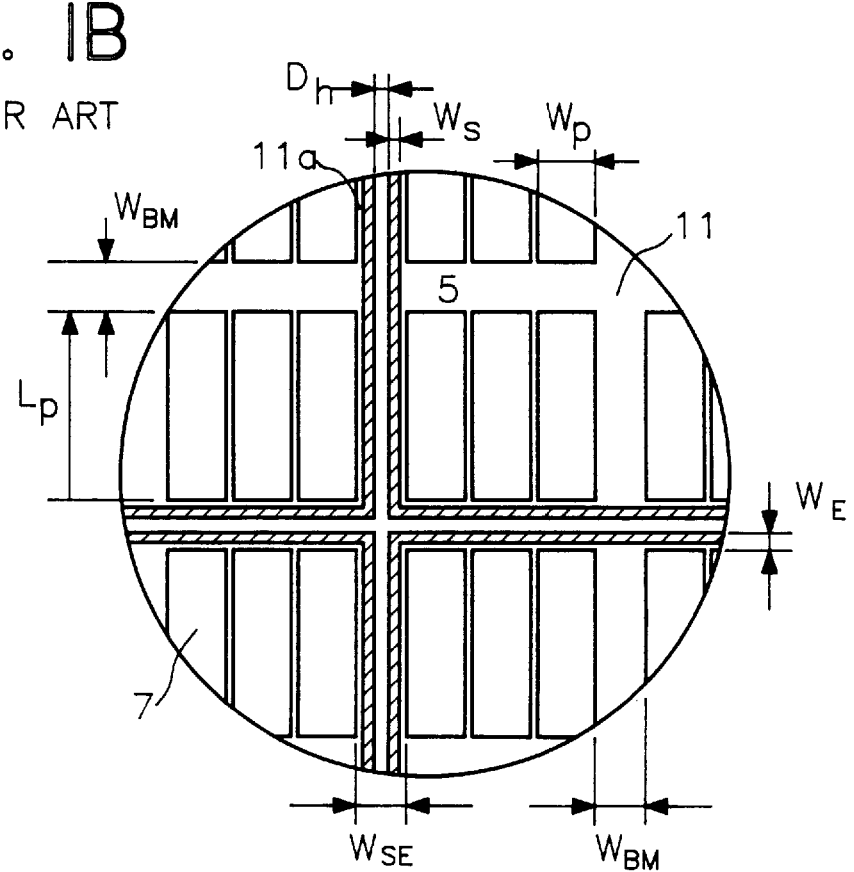

HIGH-DENSITY LIQUID CRYSTAL DISPLAY AND METHOD

BACKGROUND OF THE INVENTION

1. Field of the Invention

The present invention relates to a large area liquid crystal display (or "LCD") and a method for manufacturing the same, and more particularly, to a method for manufacturing a high-density large area LCD by tiling many LCD panels on a same level and the structure of a high-density large area LCD manufactured by such a method.

2. Discussion of the Related Art

Nowadays, in a variety of public places (stations, airports, museums, large briefing-rooms, etc.), the need for large screen display devices has been increasing. Many kinds of display devices for transmitting public information have been developed. Projection type displays and multi-tube displays have been developed and used to meet this need. However, these devices have some deficiencies in performance. It is difficult for the displays to achieve high-density or high-resolution images, and the displays become bulky and heavier as their screen size becomes larger. Therefore, high-resolution display devices having large diagonal area are needed that they are lighter and less bulky.

As a result of development of thin flat panel displays, various flat panel displays such as liquid crystal displays and plasma displays have been used in many fields. In particular, the liquid crystal displays are suitable for large area displays since they have unique and desirable characteristics such as flatness, thinness, high quality image, high resolution, natural color, and motion picture capability.

In general, monitors of portable TVs and/or notebook computers currently have LCDs smaller than a 15 inches in diagonal area (approximately 4 inches to 12 inches). There have been efforts for manufacturing LCDs larger than the 15 inches in diagonal area. Manufacturing yield, however, is not sufficient in manufacturing a single LCD panel larger than 20 inches on one glass substrate from current technology. Therefore, some methods have been developed and used for manufacturing large area LCDs by tiling (combining) a plurality of LCD panels with good yield.

In manufacturing a single LCD with a diagonal area of 28 inches (hereinafter 28-inch LCD) panel, using one substrate has some drawbacks as compared with tiling four 14-inch LCD panels with good manufacturing yield, for example. First, signals are delayed as the lines for transmitting image information become longer. In order to solve the signal delay problem, resistance of the lines is reduced by widening or thickening them. However, thickening each bus line results in many unpredictable problems in the performance of the LCD. Also, widening each bus line decreases image quality because the aperture ratio decreases.

Second, when 28-inch LCDs are manufactured with a specification same as 14-inch LCDs, the reliability of each element is greatly reduced and a sufficient manufacturing yield for mass-production cannot be achieved. When large screens are manufactured by using current technology, the size of a pixel increases in accordance with the size of the screen, and therefore, the quality of a image deteriorates. In fact, the pixel size for 10.4-inch LCDs with VGA quality is 100 $\mu$m wide and 300 $\mu$m long. For 20-inch LCDs, the pixel size is 200 $\mu$m wide and 600 $\mu$m long, and for 28-inch LCDs, 280 $\mu$m and 890 $\mu$m, respectively. In the case of large area LCDs, since the viewing distance is long, the increased pixel size is not such a big problem. However, it is very difficult for a large area LCD to meet the specification for a high definition television (HDTV) by using this technology.

Third, the manufacturing cost increases because it is necessary to have larger equipment as the glass substrate becomes larger. Moreover, since the current technology has a limitation in enlarging the glass substrate, it is difficult to manufacture LCDs larger than a certain dimension.

On the other hand, a method for manufacturing LCDs by tiling panels is cost-effective because it is sufficient to include an additional step of tiling panels in a conventional LCD manufacturing process. The method is also capable of manufacturing LCD of all sizes. There is no signal delay problem since signal lines on each tiled panel are individually driven with some connection. Additionally, in the case of manufacturing LCDs by a tiling method, the technology to display the image information on a screen has already been established in conventional techniques such as the multi-tube displays. Thus, the only problem is how to get a tiled display system to appear to be seamless.

To solve this problem, some reasons for seam visibility are discussed below <Ref.: G. A. Alphonse and J. Lubin of National Information Display Lab., Psychophysical Requirements for Seamless Tiled Large-Screen Displays, in '92 SID Digest>. The first reason for seam visibility is due to border lines between two joining panels. The second reason is due to misalignment of panels resulting in misaligned images. The third reason is due to luminosity variations within and among the tiled panels. The fourth reason is due to non-uniformity of color across the screen. The defects which result from the third and the fourth reasons can be improved when LCD panels are simultaneously manufactured in a batch. However, the defects which result from the first and second reasons are more important because the source of the defects is from the tiling process. Concerning to a tiling method of a LCD, conventional techniques to overcome the latter defects are discussed below.

In a first conventional technique, there is a model of a large area LCD panel manufactured by Magnascreen in 1993 <N. Mazurek, T. Zamiit, R. Blose and J. Bernkopf, A 51-inch Diagonal Tiled LCD VGA Monitor, in '93 SID DIGEST>. Referring to FIGS. 1A and 1B, this model is a 51-inch diagonal large area LCD panel 1, manufactured by tiling 48 LCD panels of 5-inch diagonal LCD 3. This model has pixies formed by three color-dots (or dots) 7 of R, G, B having 370 $\mu$m in width (Wp) and 1270 $\mu$m in length (Lp). A 125 $\mu$m-wide black matrix is in between these dots. The model is a 51-inch large area VGA LCD panel 1 having 640×480 pixels (1920×480 dots), which is manufactured by tiling 8×6 array of LCD panels 3 having pixels in and 80×80 array, a 350 $\mu$m-wide black matrix in between these pixels (FIG. 1A). In this model, to solve the visible seam parts, the width ($W_{SE}$) of the seam parts is formed having the same size as that ($W_{BM}$) of the black matrix, 350 $\mu$m. Therefore, the edge black matrix 11a is formed having a 125 $\mu$m width, the same as the black matrix 11.

Referring to FIG. 1B, these LCD panels are tiled so that the horizontal tiling gap ($D_h$) can be 50 $\mu$m. This model has relatively large specifications including pixels such that sophisticated technology is not absolutely necessary for tiling the panels. This method has succeeded to some extent in manufacturing large area displays, but a high quality image cannot be obtained. Also, this method has some problems in reducing defects resulting from tiling many small panels, and a problem in making the characteristics of each panel identical.

In a second conventional technique, we will refer to the tiling technology and a model presented by APEX KOREA in 1995 (Ref.: Large Area Liquid Crystal Display Realized by Tiling of Four Back Panels, '95 ASIA DISPLAY). Referring to FIGS. 2A and 2B, this model is a 10.4-inch diagonal LCD panel manufactured by tiling 4 STN (Super Twisted Nematic) LCD panels of 5-inch diagonal dimension. It is manufactured by using a very sophisticated technology, in which the horizontal ($D_h$) and vertical ($D_v$) tiling gaps are within 5 µm and 0.3 µm, respectively (FIG. 2C). In order to realize this, the LCD panels 3 are processed after paraffin is applied on the surface of the seam parts so that precise processing can be performed. However, in this model, the upper substrates of liquid crystal display panels 3a are tiled on the upper substrate of a large area liquid crystal display panel 1a, and the lower substrates of LCD panel 3b are tiled on the lower substrate of large area LCD panel 1b. Then, these upper and lower substrates of the large area LCD panel are joined with a sealing material 5. The liquid crystal material is injected into the gap of the joined upper and lower panels. Therefore, this technique is only valuable where high technology in tiling with no visible seam parts is suggested.

In a third conventional technique, a model was presented by Sharp of Japan at the Asia Display in 1995. Referring to FIG. 3, this model is a 40-inch diagonal large area LCD panel 1 manufactured by tiling the longer sides of two LCD panels 3 of 28-inch diagonal dimension (22.4-inch×16.8-inch). This model is manufactured by tiling two LCD panels within 30 µm of the horizontal tiling gap ($D_h$) after they are precisely processed.

In a fourth conventional technique, a model was presented by Fujitsu of Japan in 1995 (KAWASAKI, LCD Multi-Panel Display, '95 Asia Display). Referring to FIGS. 4A and 4B, this model is a 90-inch diagonal large LCD panel manufactured by tiling 48 panels of 10.4-inch diagonal dimension 3. In this model, a projection technique, which is not a new technology for tiling in direct view display, is used to deal with visible seam parts, in which a lens 15 is located in front of the LCD panel 3 to enlarge pictures. The enlarged pictures become aggregated on a screen 17. This method can manufacture large area displays with high density by using an optical device. However, the panels have to be thicker (the panels being 28 cm thick in this model) due to the projection device, and the seam is very easily visible.

SUMMARY OF THE INVENTION

Accordingly, the present invention is directed to a high-density liquid crystal display and method that substantially obviates one or more of the problems due to limitations and disadvantages of the related art.

A feature of the present invention is to provide an LCD having a large screen area.

Another feature of the present invention is to provide a high density large area LCD.

A still another feature of the present invention is to provide a high quality and high density large area LCD with a substantially unnoticeable seam.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for manufacturing a display including first and second substrates, each having an inner light shielding region and an edge light shielding region, comprises the steps of defining the edge light shielding region into a first portion and a second portion; defining an area of the first substrate, the area including the first portion of the edge light shielding region; removing the area including the first portion of the edge light shielding region and leaving the second portion of the edge light shielding region; and combining the first and second substrates at the second portion of the edge light shielding region.

In another aspect, the present invention provides a method for manufacturing a display including first and second substrates, each having an inner light shielding region and an edge light shielding region, the method comprising the steps of defining a first edge light shielding region of the first substrate into a first portion and a second portion; defining a first area of the first substrate, the first area including the first portion of the first edge light shielding region; removing the first area including the first portion of the first edge light shielding region and leaving the second portion of the first edge light shielding region; defining a second edge light shielding region of the second substrate into a first portion and a second portion; defining a second area of the second substrate, the second area including the first portion of the second edge light shielding region; removing the second area including the first portion of the second edge light shielding region and leaving the second portion of the second edge light shielding region; and combining the first and second substrates.

In another aspect, the present invention provides a display comprising a plurality of flat panels, each flat panel including at least 1800×400 dots (600×400 pixels), an inner light shielding region between dots having a first width, and an edge light shielding region having a second width, the second width being smaller than the first width, wherein the edge light shielding regions of the flat panels are joined.

In another aspect, the present invention provides a display comprising a plurality of sectors, each sector including at least 1800×400 dots (600×400 pixels), each dot having a first width, and an edge light shielding region at edges of the sector and having a second width, the edge light shielding region of one sector being joined with another edge light shielding region of an adjacent sector, wherein the second width of the two joined edge light shielding regions at edges of the sectors being smaller than the first width of each dot.

In a further aspect, the present invention provides a display comprising a plurality of flat panels, each flat panel including an inner light shielding region between the dots and having a first width, and an edge light shielding region having a second width, the second width being smaller than the first width, wherein the edge light shielding region of each of the flat panels are joined.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1A is a plan view showing a conventional large area liquid crystal display;

FIG. 1B is an enlarged plan view of a conventional large area liquid crystal display in FIG. 1A;

DETAILED DESCRIPTION OF THE PREFERRED EMBODIMENTS

Reference will now be made in detail to the preferred embodiments of the present invention, examples of which are illustrated in the accompanying drawings.

A method for manufacturing a LCD panel includes forming a first substrate and a second substrate including various elements of the LCD panel; printing a seal at the edge of the first or the second substrate with a hole for injecting liquid crystal; attaching the first and the second substrates by heating and hardening the seal; injecting liquid crystal; sealing the injecting hole; and removing and processing a portion of the edge of the substrates.

Figure 2A:
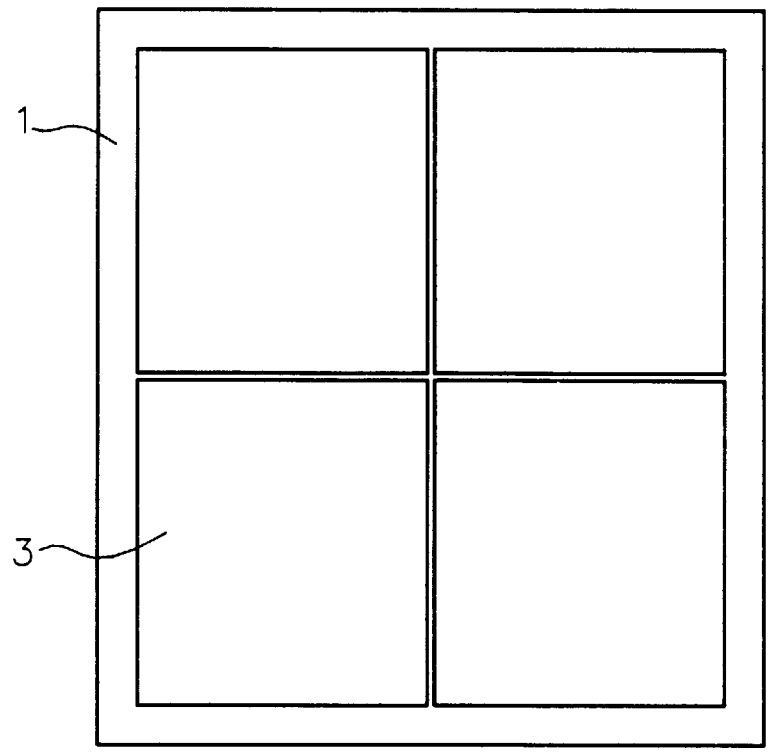
FIG. 2A is a plan view showing another conventional large area liquid crystal display.
Figure 2B:
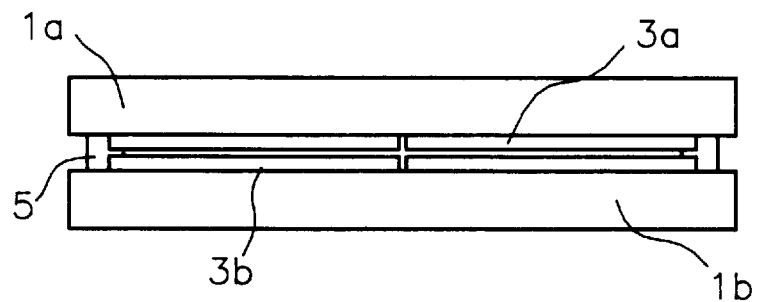
FIG. 2B is a cross-sectional view of the conventional large area liquid crystal display in FIG. 2A.
Figure 2C:
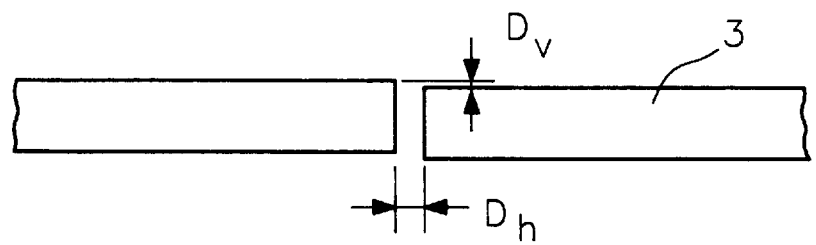
FIG. 2C is an enlarged cross-sectional view showing the tiling method of the conventional liquid crystal display in FIG. 2A.
Figure 3:
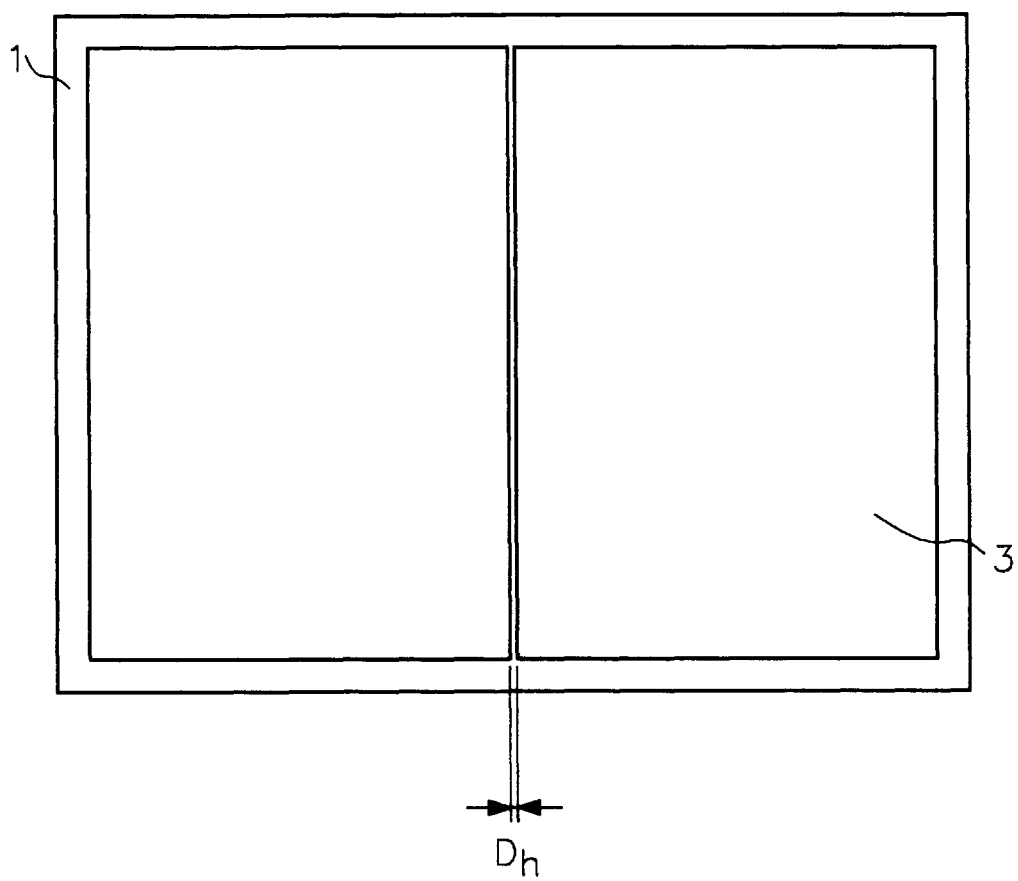
FIG. 3 is a view showing another conventional large area liquid crystal display.
Figure 4A:
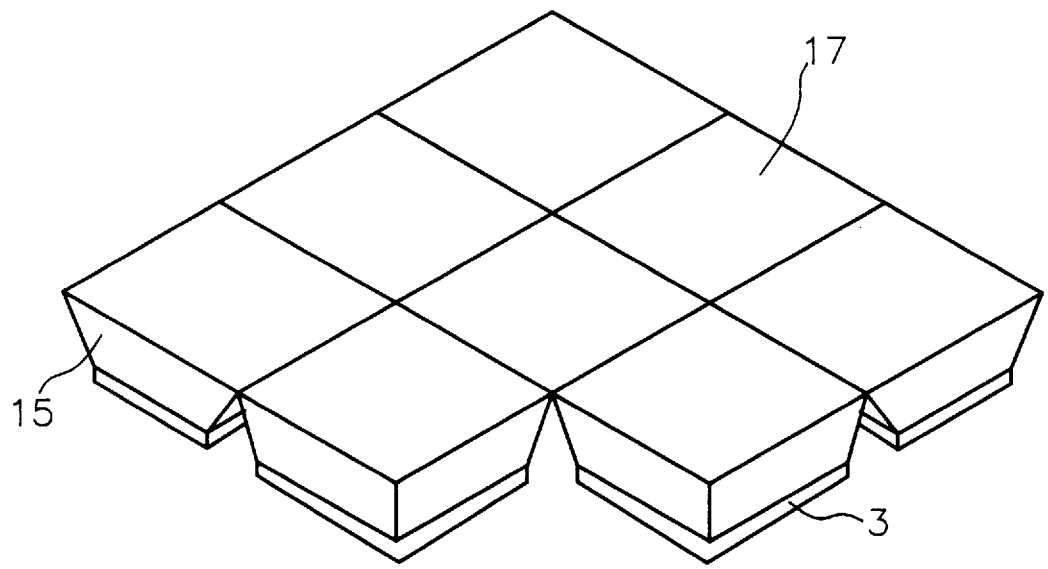
FIG. 4A is a plan view showing yet another conventional large area liquid crystal display.
Figure 4B:
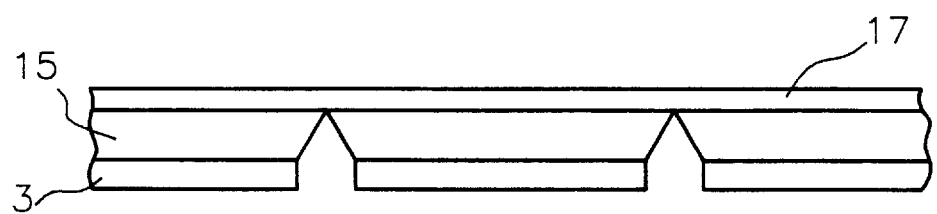
FIG. 4B is a cross-sectional view showing the conventional large area liquid crystal display in FIG. 4A.
Figure 5A:
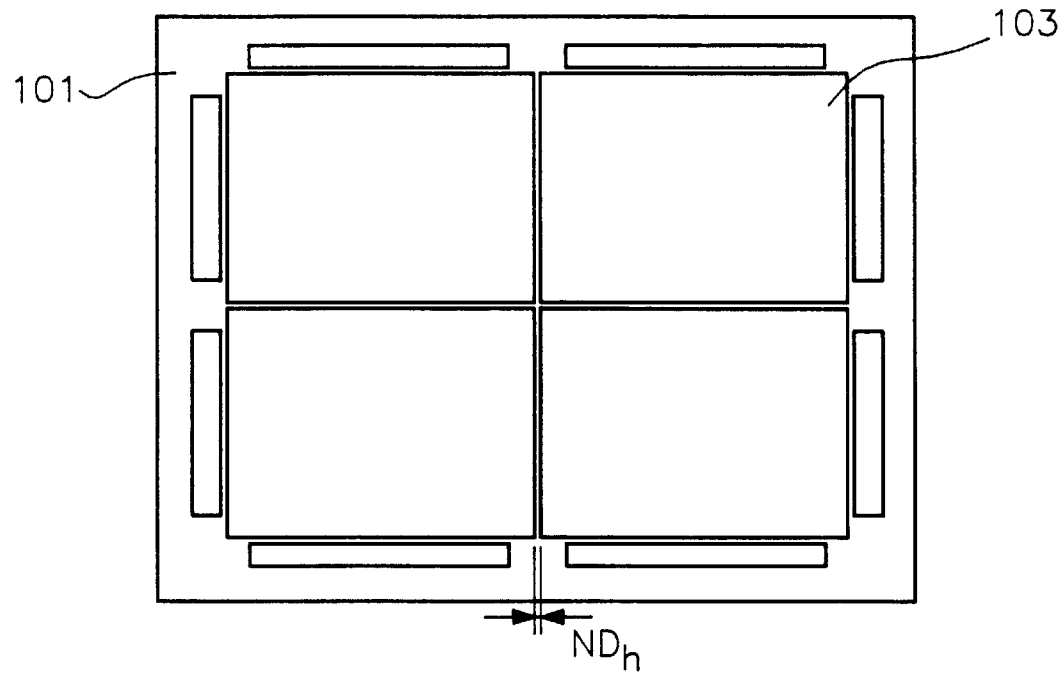
FIG. 5A is a plan view showing the structure of a high-density, large area liquid crystal display according to the present invention.
Figure 5B:
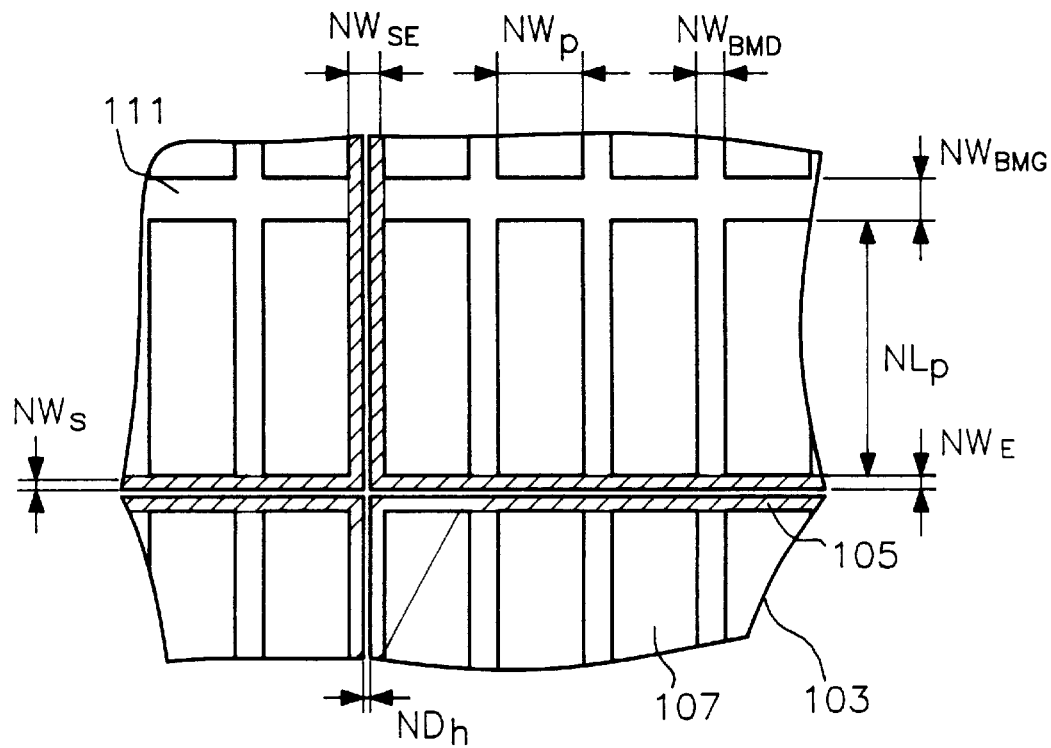
FIG. 5B is an enlarged plan view of the high-density large area liquid crystal display in FIG. 5A.

Referring to FIGS. 5A and 5B, the entire screen is observed to be divided due to the border of each panel including the seal 105 printing portion and the edge black matrix 111a (FIGS. 6A and 7A) when the LCD panels 103 manufactured by the above method are tiled. Therefore, it is very important to manufacture the seam narrow enough to be unnoticeable to the viewer. The process for manufacturing a high-density large area LCD panel is discussed below.

In FIG. 5B and through the figures, the labels are defined as follows. $NW_S$ is the width of the bonded seal. $NW_{SE}$ is the width of the seam. $NW_P$ is the width of the dot. $NW_{BMD}$ is the width of the black matrix at the data bus lines. $NW_{BMG}$ is the width of the black matrix at the gate bus lines. $NW_E$ is the width of the edge black matrix. $NL_P$ is the dot length (equal to pixel length). $ND_h$ is the horizontal tiling gap.

With reference to FIG. 5A, a high-density large area LCD panel 101 is formed by tiling four LCD panels 103. FIG. 5B shows an enlarged view of the tiled edge portion of the panels. In the present invention, typical VGA LCD panels are tiled. The general structure of a VGA LCD panel is as follows.

On an LCD panel, dots 107 are designed by a matrix array of 1920 dots and 400 dots (640 pixels and 400 pixels) in horizontal and vertical directions (in VGA mode), respectively. Each dot has a rectangular shape. At the corner of each dot, a thin film transistor 125 is formed to be connected with a pixel electrode 127 and drive the liquid crystal of the pixel. Color filters 123 are formed according to the pixel electrodes. At each dot, a color filter having one of red, green and blue colors is formed. If a dot has a red color filter, the next dot has a green color filter, and the one after the dot having the green has a blue color filter. Black matrix 111 shielding the light from other dots is formed among these color filters. The black matrix 111 has a width of about ¼~⅓ value ($NW_{BMD}$) of the width ($NW_P$) of each dot 107 at the data bus lines, and about ⅓~⅔ value ($NW_{BMG}$) at the gate bus line. Therefore, the seam can be unnoticeable if the seam width ($NW_{SE}$) of the tiled LCDs is formed similar to that of the black matrix 111 width ($NW_{BMD}$ or $NW_{BMG}$). To do this, the width ($NW_S$) of the sealing portion and that ($NW_E$) of the edge black matrix has to be about half of the width ($NW_{BMD}$ or $NW_{BMG}$) of the black matrix between each dot. To facilitate this, the sealing is formed within the edge black matrix area.

Table 1 below shows how the above-mentioned method applies to a large area LCD manufactured by tiling 10-inch and 14-inch diagonal panels. In Table 1, the specifications of typical models of LCD panel are described.

Figure 6A:
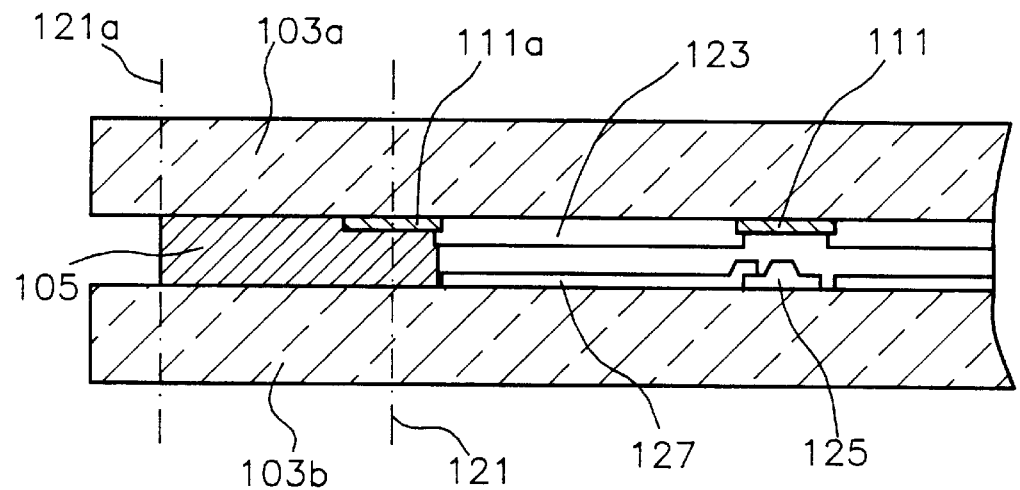
FIG. 6A is an enlarged cross-sectional view of one example showing the specification of a high-density large area liquid crystal display at the seam parts according to the present invention.
Figure 6B:
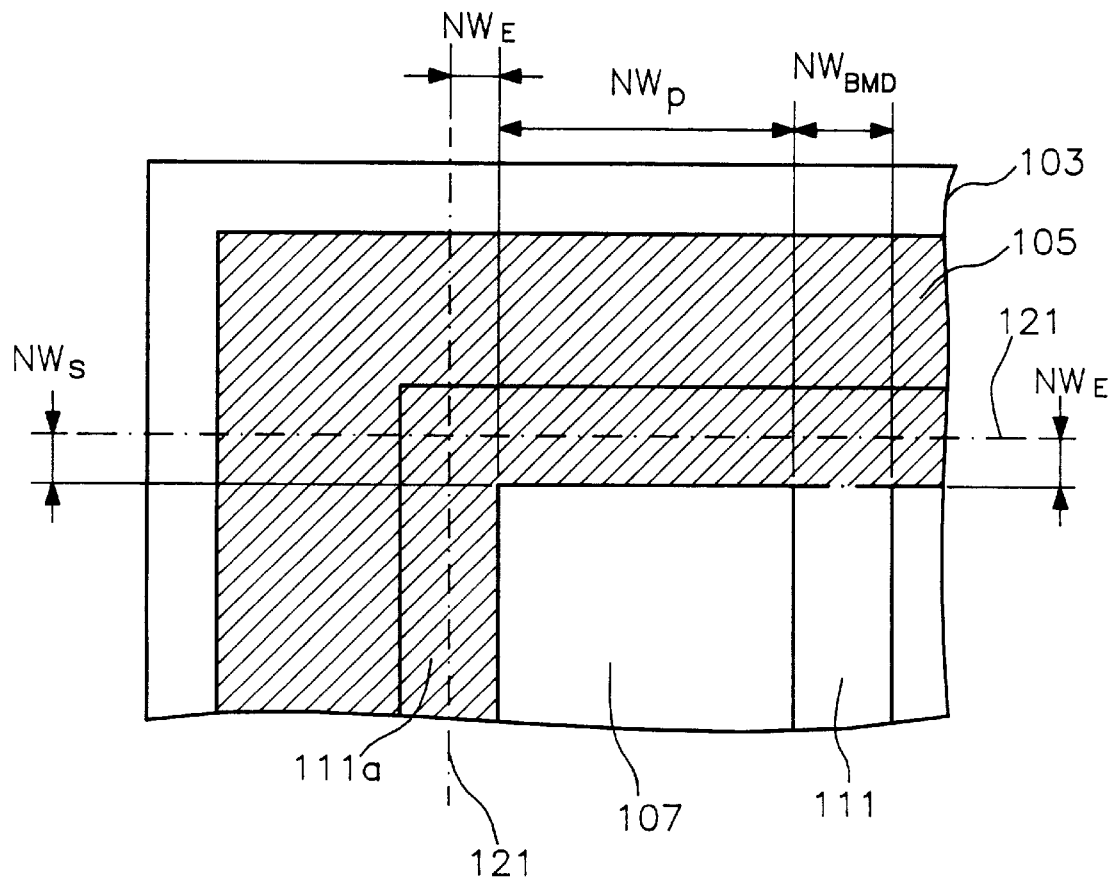
FIG. 6B is an enlarged plan view of the example in FIG. 6A.
Figure 7A:
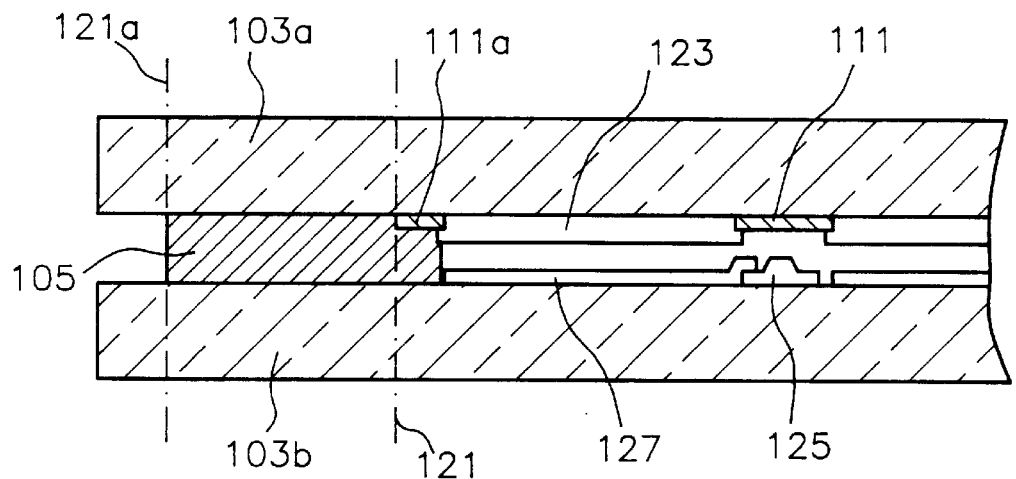
FIG. 7A is an enlarged cross-sectional view of another example showing the specification of a high-density large area liquid crystal display at the seam parts according to the present invention.
Figure 7B:
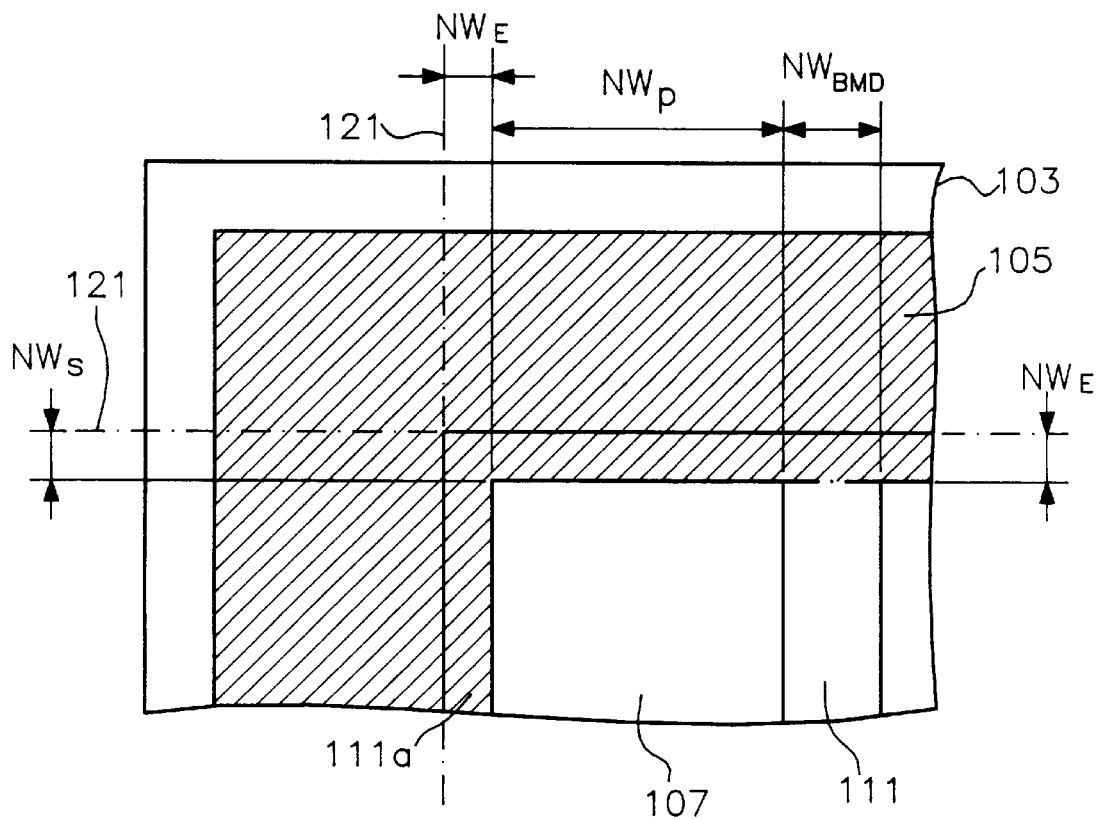
FIG. 7B is an enlarged plan view of the example in FIG. 7A.

FIGS. 7A and 7B show a second example of the high-density large area liquid crystal display of the present invention at the seam portions. The second example is substantially similar to the first example shown in FIGS. 6A and 6B except that the edge black matrix 111a does not extend beyond the cutting line 121. Preferably, the edge black matrix 111a has a width about half the width of the black matrix 111.

For the purpose of describing the present invention, LCDs having the following specification will be used. However, the present invention is not limited to such specification. Referring to FIGS. 5A and 5B, in the present invention, we select the specification of LCDs with 30% aperture ratio for VGA quality and 25% aperture ratio for SVGA quality. Seal printing is performed with 70 μm width with 5 μm tolerance. Accordingly, the seal width ($NW_{SE}$) is formed with values in a range of about 210 μm to 250 μm. In order to minimize the seam width ($NW_S$), the sealing area is set to correspond almost exactly to the inner border line of the edge black matrix. Therefore, the edge black matrix width is in a range of about 35 μm to 50 μm, and the seal 105 is formed from the inner border line of the edge black matrix 111a (see FIGS. 6A and 7A, for example) to outside with a width in a range of about 210 μm to 250 μm.

To tile the LCD panels, the edge portions of the LCD panels are formed by cutting them with about 20 μm to 30

TABLE 1

Specifications of typical models of LCD panel (scale: μm)

|  | 10 inch | | | | 14 inch | | | |
| --- | --- | --- | --- | --- | --- | --- | --- | --- |
|  | VGA | | SVGA | | VGA | | SVGA | |
| Aperture ratio | 56% | 30% | 50% | 25% | 56% | 30% | 50% | 25% |
| Color dot width ($NW_P$) | 110 | 110 | 70 | 70 | 160 | 160 | 100 | 100 |
| Color dot length ($NW_P$) | 330 | 330 | 210 | 210 | 480 | 480 | 300 | 300 |
| BM width ($NW_{BMD}$) (at the data bus lines) | 30 | 45 | 20 | 30 | 40 | 50 | 25 | 35 |
| BM width ($NW_{BMG}$) (at the gate bus lines) | 45 | 70 | 30 | 50 | 60 | 75 | 35 | 50 |

On the other hand, in general, after the upper substrate 103a and the lower substrate 103b are joined, the seal width is enlarged 2~4 times than its original width of printing. Therefore, the seal width ($NW_S$) becomes about 100 μm to 400 μm after the substrates are joined with 50 μm~100 μm width of the seal printing by conventional techniques. Moreover, because the sealing shape of the seal has a wide range of deviation, there are margins of about 100 μm wide between the seal and the inner border line of the edge black matrix 111a. The details of the method to achieve this structure of the LCD panels are explained by following preferred embodiments.

FIGS. 6A and 6B show a first example of the high-density large area liquid crystal display of the present invention at the seam portions. In FIG. 6A, an upper substrate 103a and a lower substrate 103b are joined with a seal 105. The upper substrate 103a includes a light shielding material, including a black matrix 111 and an edge black matrix 111a. The upper substrate 103a also includes a color filter 123. The lower substrate 103b includes a pixel electrode 127 and a thin film transistor 125. Reference lines for cutting are shown with labels 121 and 121a. FIG. 6B shows an enlarged plan view of FIG. 6A. The enlarged plan view of FIG. 6B illustrates the widths of the edge black matrix ($NW_E$), the black matrix at the data base lines ($NW_{BMD}$), the bonded seal, and the pixel.

μm of seam width. In other words, an LCD panel is cut along the line which marks the offset position from the outer border line of the seal to the inner one with about 200 μm. Then, the LCD panels 103 made by such a method are tiled by using, for example, the APEX technique of tiling within 5 μm so that the seam width is about 50 μm to 70 μm, which is one or one and one-half times the width of the black matrix formed at the data bus lines (see FIGS. 6A and 6B).

Figure 8A:
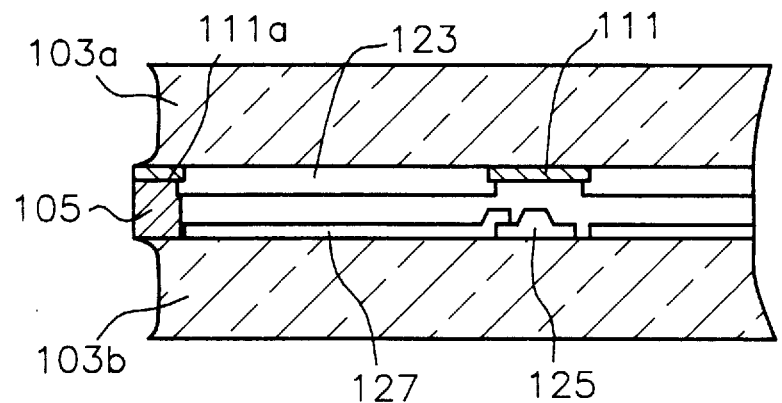
FIG. 8A is an enlarged cross-sectional view showing an edge of a panel of a liquid crystal display after being cut.
Figure 8B:
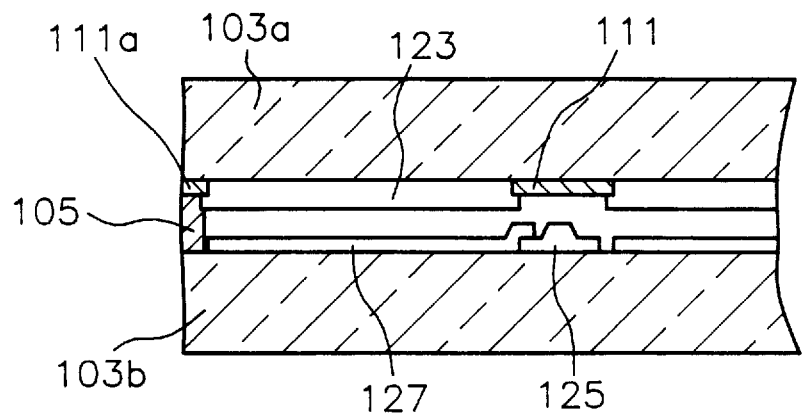
FIG. 8B is an enlarged cross-sectional view showing an edge of a panel of a liquid crystal display after grinding.
Figure 8C:
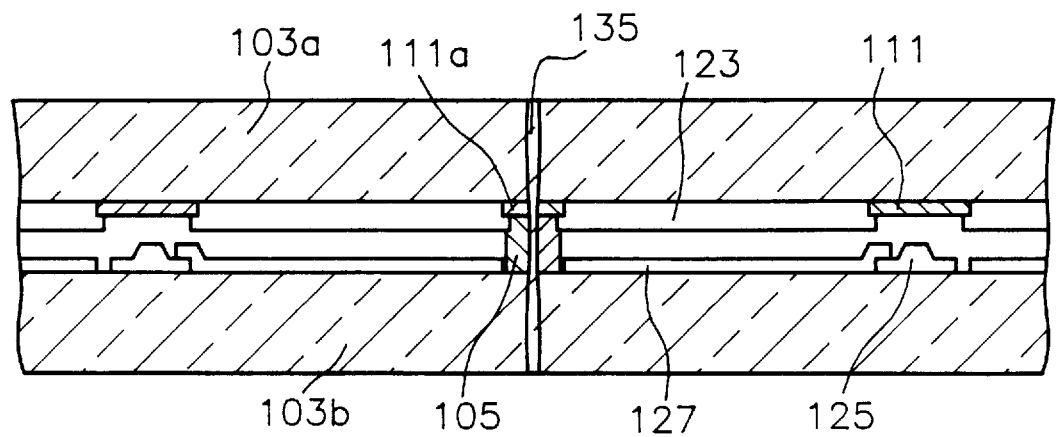
FIG. 8C is an enlarged cross-sectional view showing tiled panels of a liquid crystal display after being processed according to the present invention.

Referring to FIGS. 8A to 8C, although the seam parts are cut precisely, the edge may be still coarse and not uniform (FIG. 8A). The edge undergoes precise grinding to achieve a uniformity of about 5 μm (FIG. 8B). These LCD panels are tiled by filling the gap between the panels with a filling material 135 having a refraction rate similar to that of a glass such as SOG (Spin On Glass) or black sealant (FIG. 8C).

Generally, it is difficult to cut precisely the edge of an LCD that is formed by joining the upper and lower substrates and injecting the liquid crystal. To make it easier, the edge black matrix 111a is formed having one-half the width of the other parts of the black matrix 111. Because only the black matrix is opaque whereas the glass and the seal are transparent, cutting becomes easy when the outer border of the edge black matrix is used as a reference line for cutting (see FIG. 7A and FIG. 7B). This is the preferred method in the actual process and it is possible to cut it precisely even with naked eyes (FIG. 8A). The edge undergoes precise grinding using an ultra-fine grinding method to achieve a uniformity of about 5 μm (see FIG. 8B), which is the same as in the preferred embodiment. These LCD panels are tiled by filling the gap between the panels with a filling material 135 having a refraction rate similar to that of a glass such as SOG (Spin On Glass) or black sealant (FIG. 8C).

However, it is difficult to determine which method is best to cut the substrates precisely. Although conventional cutting method is adequate for cutting the glass substrate only, the LCD panels also have sealing parts formed with epoxy resin. These sealing parts are hardened by heating. Therefore, the present invention provides several cutting methods for precisely cutting the LCD panels. Various methods for cutting the LCD panels precisely are explained in the following preferred methods. Specifically, the preferred cutting methods are explained with referenced to preferred embodiments shown in FIGS. 6A and 7A.

Figure 9A:
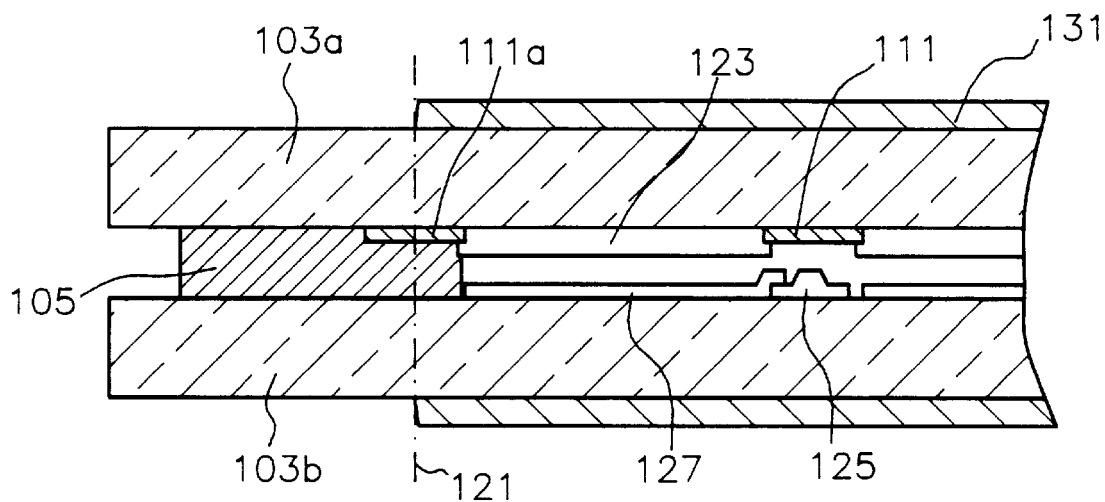
FIG. 9A is an enlarged cross-sectional view showing the first preferred method of cutting the seam parts in FIG. 6A according to the present invention.
Figure 9B:
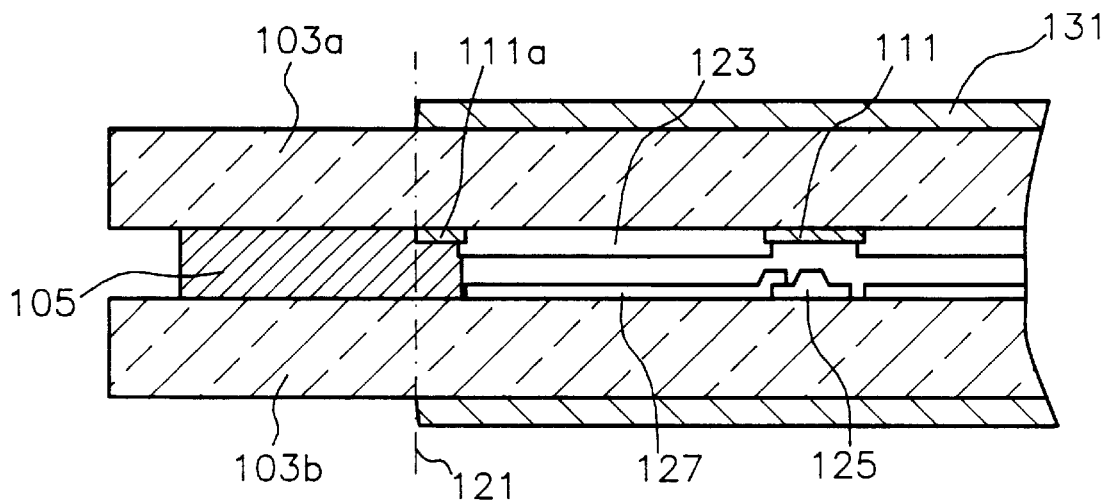
FIG. 9B is an enlarged cross-sectional view showing the first preferred method of cutting the seam parts in FIG. 7A according to the present invention.
Figure 10A:
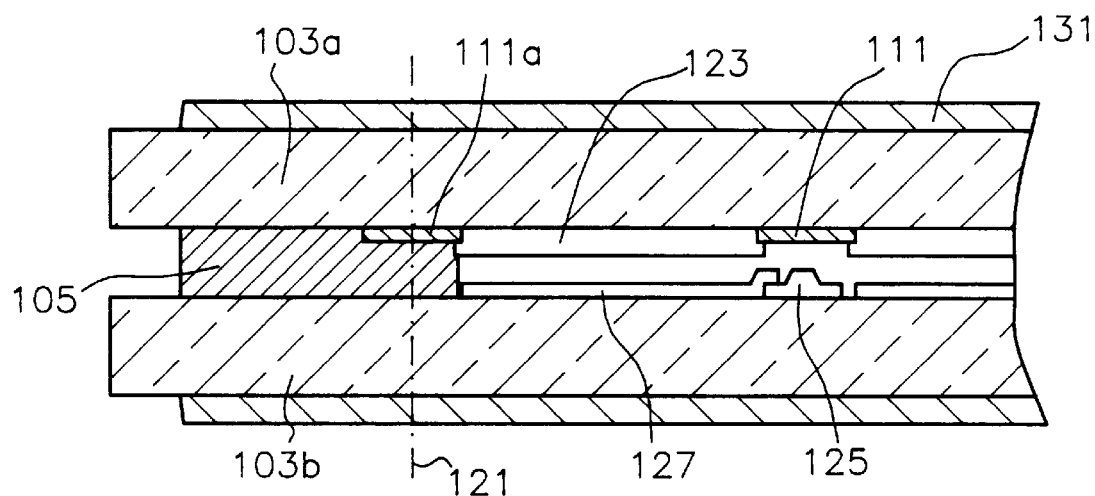
FIG. 10A is an enlarged cross-sectional view showing the second preferred method of cutting the seam parts in FIG. 6A according to the present invention.
Figure 10B:
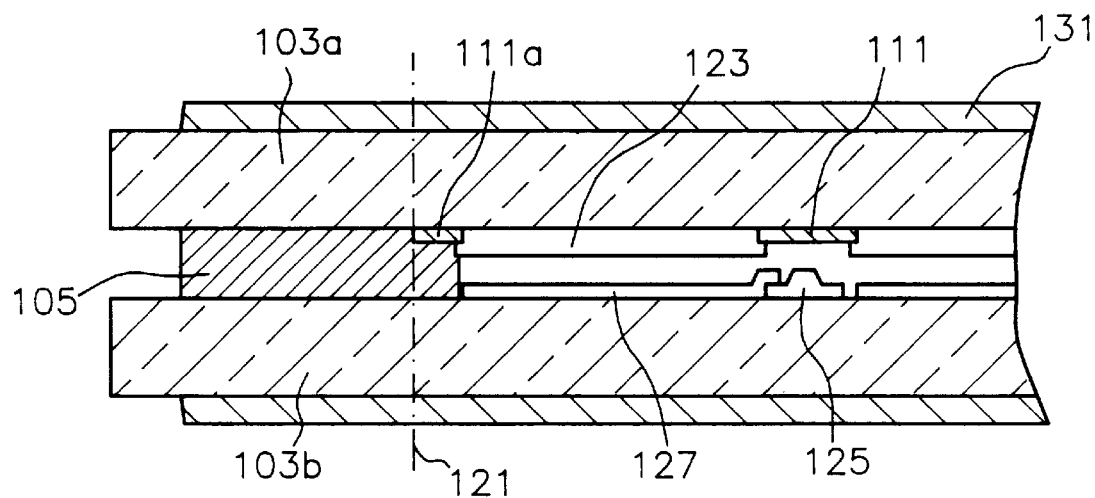
FIG. 10B is an enlarged cross-sectional view showing the second preferred method of cutting the seam parts in FIG. 7A according to the present invention.

Referring to FIGS. 9A and 9B, starting from the embodiments shown in FIGS. 6A and 7A, respectively, etch-protecting materials 131 are coated on both sides of the panels up to the cutting line 121. For a more precise profile for etching, the etch protector 131 is coated along the outer border line of the seal 105, as shown in FIGS. 10A and 10B. When the wet etching method is used for cutting, the enchant is preferably selected from one of HF, $NH_4F$, and BOE (Buffered Oxide Etchant). On the other hand, when dry etching method is used, the etchant is preferably selected from ($CF_4+O_2$), ($SF_6+O_2$), and ($CF_4+SF_6+O_2$). The etching process etches the glass substrates but some parts of the etch protector 131 and seal 105 may remain. The remaining material is easily removed by grinding. The etch-protecting materials 131 are organic materials which are not affected by the enchant. In particular, polarizing plats may be used as an etch protector in order to reduce the manufacturing step. Epoxy resin and metals (Cr, ITO) may also be used. The coating thickness varies, however, according to the etchant density and etching rate, because the etchant affects these materials.

Figure 11A:
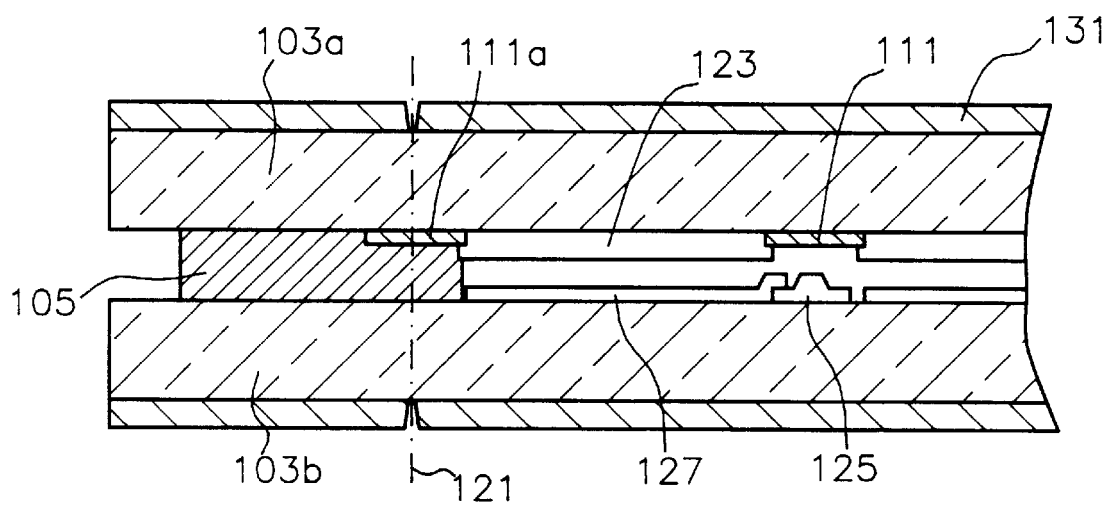
FIG. 11A is an enlarged cross-sectional view showing the third preferred method of cutting the seam parts in FIG. 6A according to the present invention.
Figure 11B:
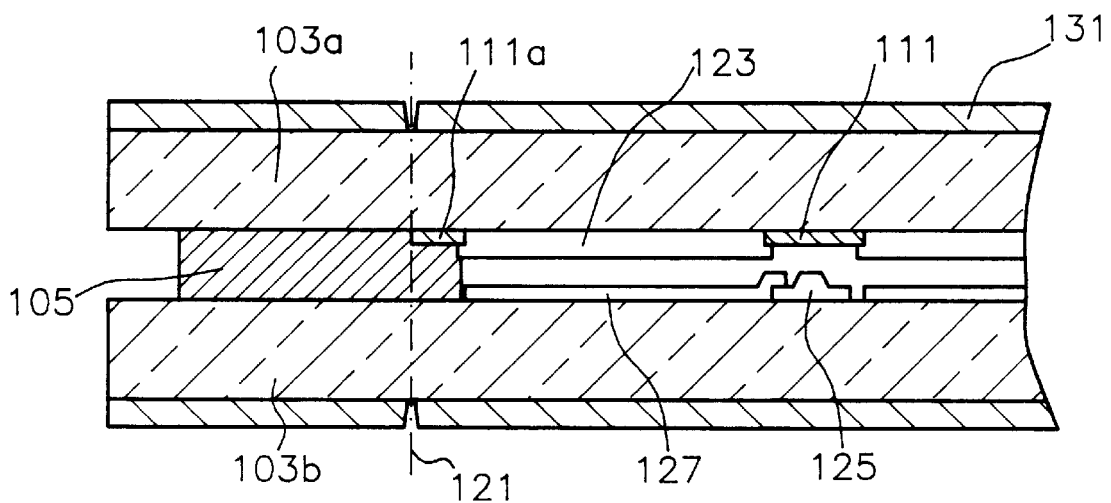
FIG. 11B is an enlarged cross-sectional view showing the third preferred method of cutting the seam parts in FIG. 7A according to the present invention.

Another preferred embodiment of the present invention is shown in FIGS. 11A and 11B. This method is more efficient than the previously described method. In particular, the etch protectors 131 are coated at both sides of the LCD panel 103a and 103b and a notch (or a V-shaped cut) is formed at least on one side and preferably on both sides at the cutting line 121. The panel is cut by etching the cutting line 121. This method is performed in shorter time because the amount of the substrates to be etched is less than etching without the notch. For example, the etching takes about 15 minutes to cut a 0.5 t glass substrate using 25% of HF enchant.

Figure 12A:
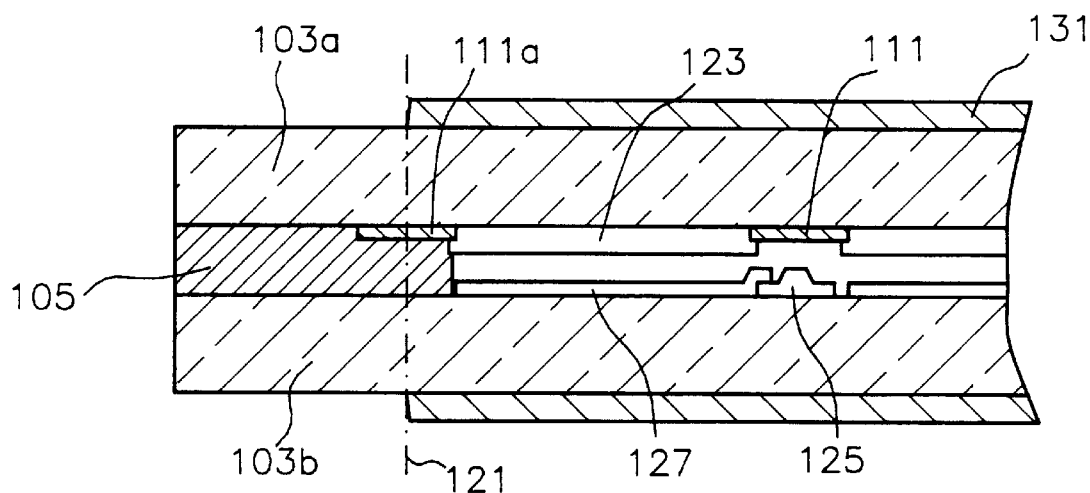
FIG. 12A is an enlarged cross-sectional view showing the fourth preferred method of cutting the seam parts by in FIG. 6A according to the present invention.
Figure 12B:
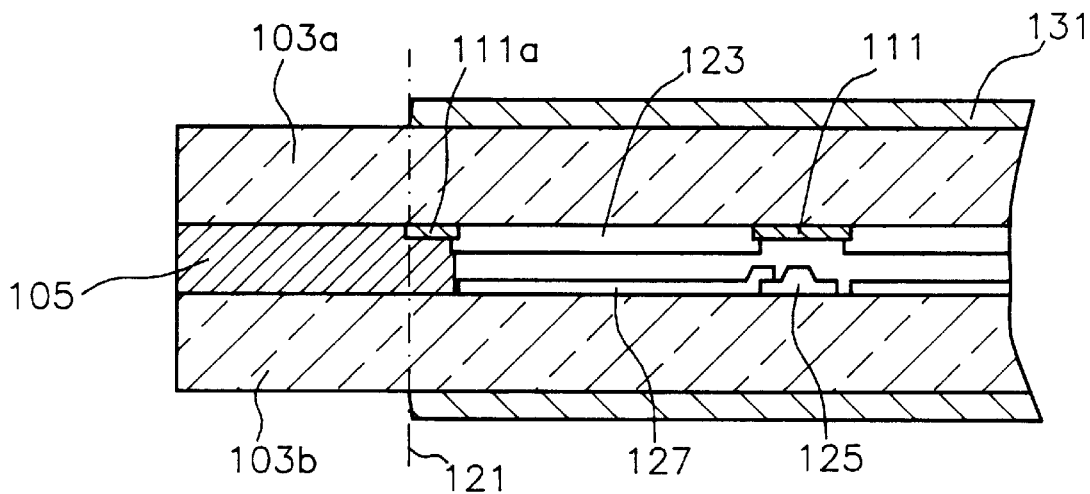
FIG. 12B is an enlarged cross-sectional view showing the fourth preferred method of cutting the seam parts in FIG. 7A according to the present invention.
Figure 13A:
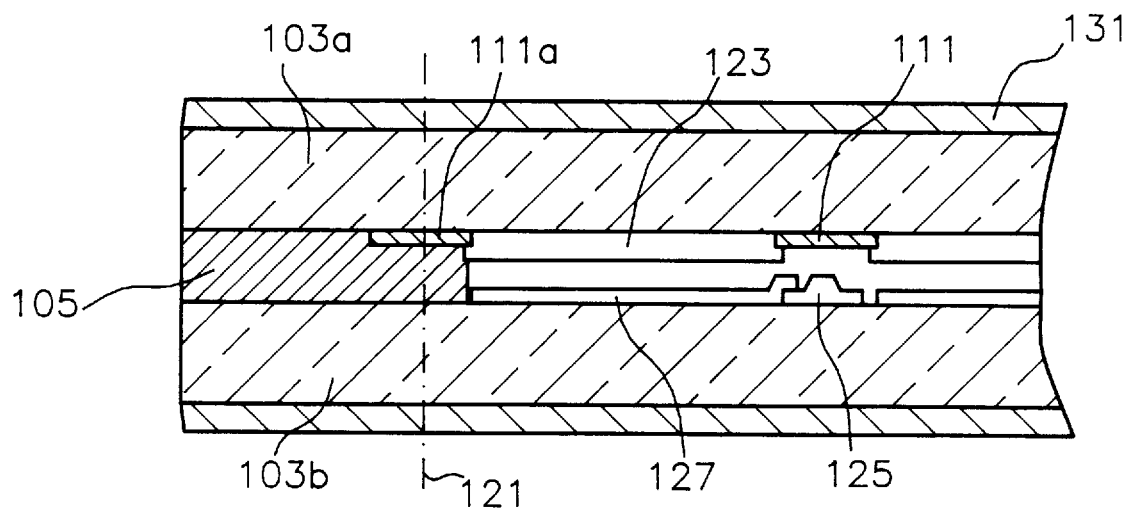
FIG. 13A is an enlarged cross-sectional view showing the fifth preferred method of cutting the seam parts in FIG. 6A according to the present invention.
Figure 13B:
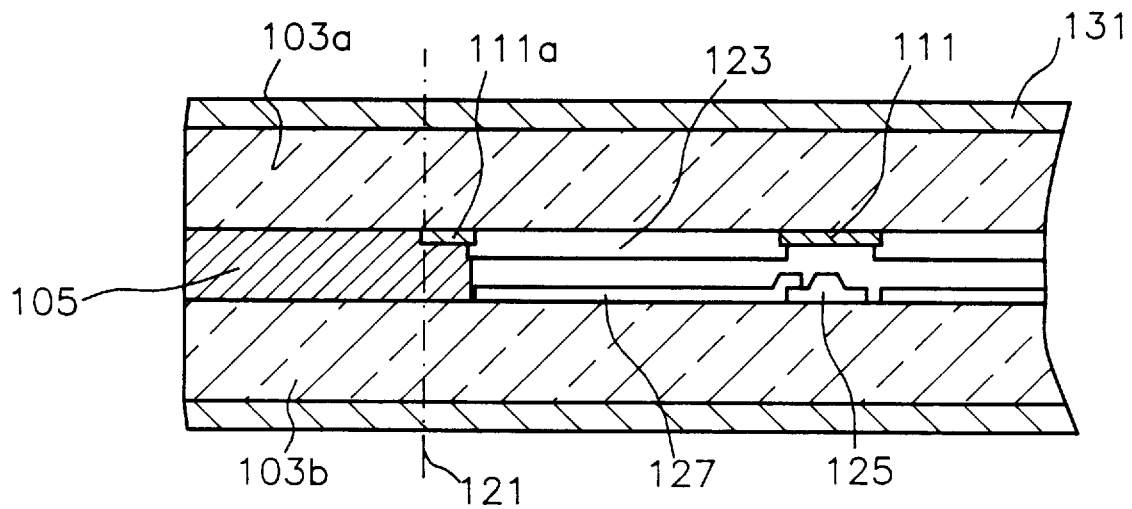
FIG. 13B is an enlarged cross-sectional view showing the fifth preferred method of cutting the seam parts in FIG. 7A according to the present invention.

Another preferred embodiment of the present invention is shown in FIGS. 12A and 12B. This method provides a better etching profile than the previously described method. In this method, the outer border line of the seal 105 is set to be flush with the first cutting line 121a (see FIGS. 6A and 7A). The protruding glass parts beyond the first cutting line 121a may be removed by conventional cutting methods. After the removal, the edge is not smooth since the border line of the seal is not smooth. Therefore, the edge is touched by chemical or mechanical polishing to make it smooth. Then, the etch protectors 131 are coated on both sides of the LCD panels (103a, 103b), and the panels are cut by etching. Additionally, when the etch protectors 131 are coated as in FIG. 10A, the etch protectors 131 cover the substrates up to the outer border line of the seal 105. In this case, the etch protectors 131 are coated on the whole surface of the glass substrates, as shown in FIGS. 13A and 13B).

Figure 14A:
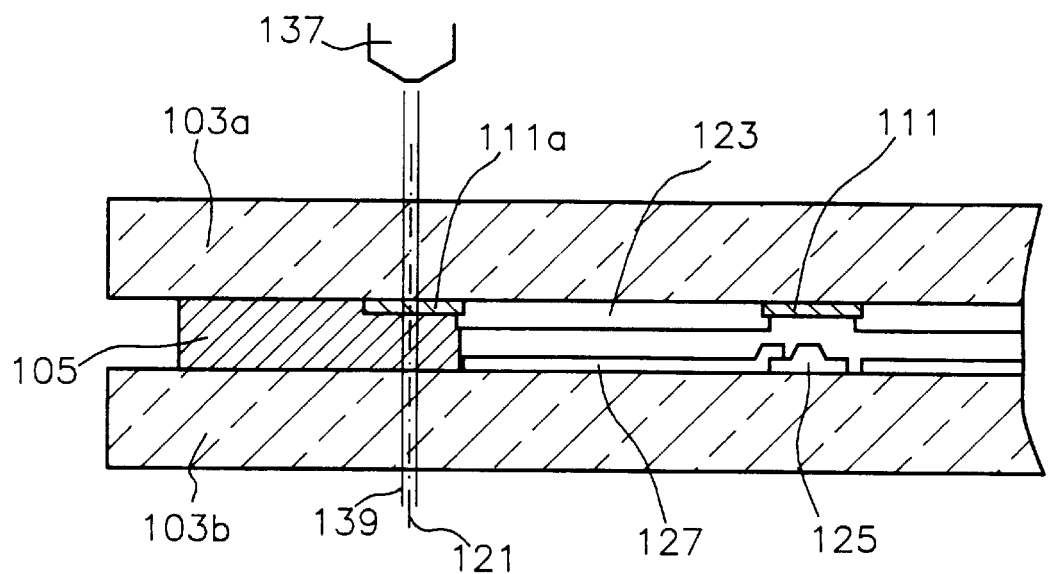
FIG. 14A is an enlarged cross-sectional view showing the sixth preferred method of cutting the seam parts in FIG. 6A according to the present invention.
Figure 14B:
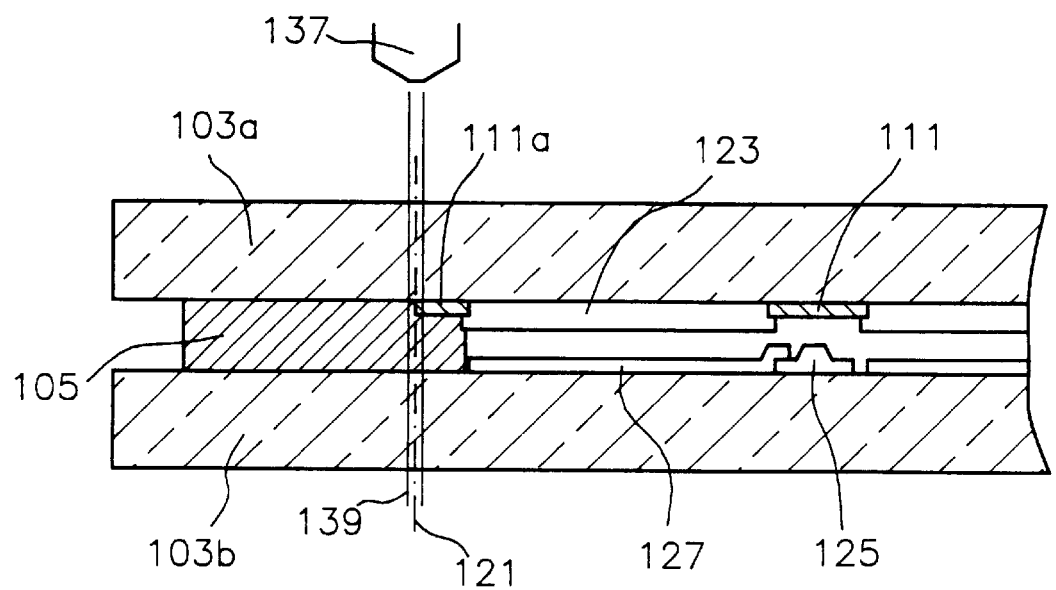
FIG. 14B is an enlarged cross-sectional view showing the sixth preferred method of cutting the seam parts in FIG. 7A according to the present invention.
Figure 15A:
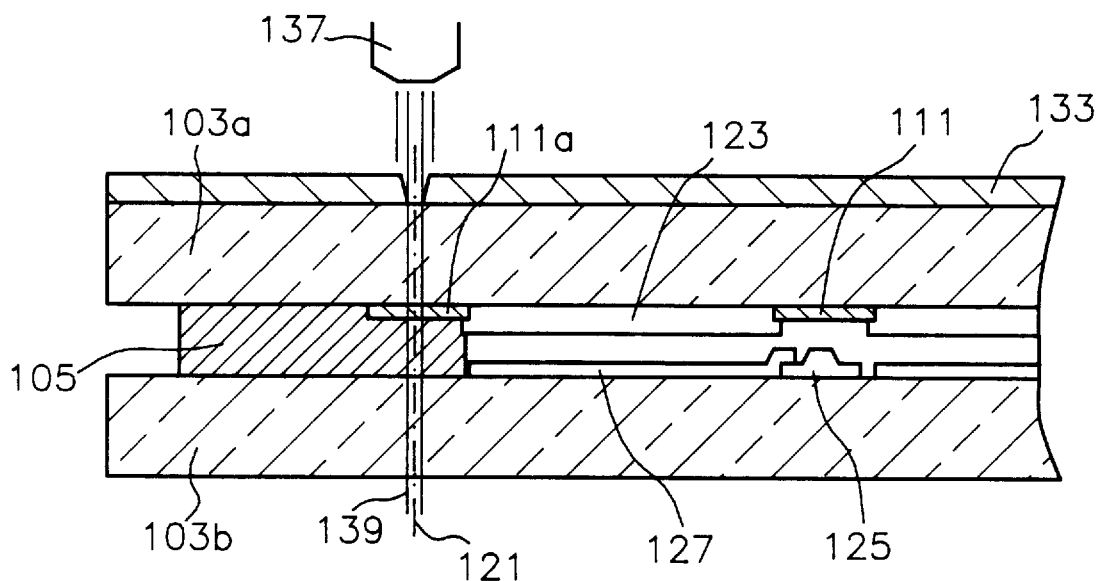
FIG. 15A is an enlarged cross-sectional view showing the seventh preferred method of cutting the seam parts in FIG. 6A according to the present invention.
Figure 15B:
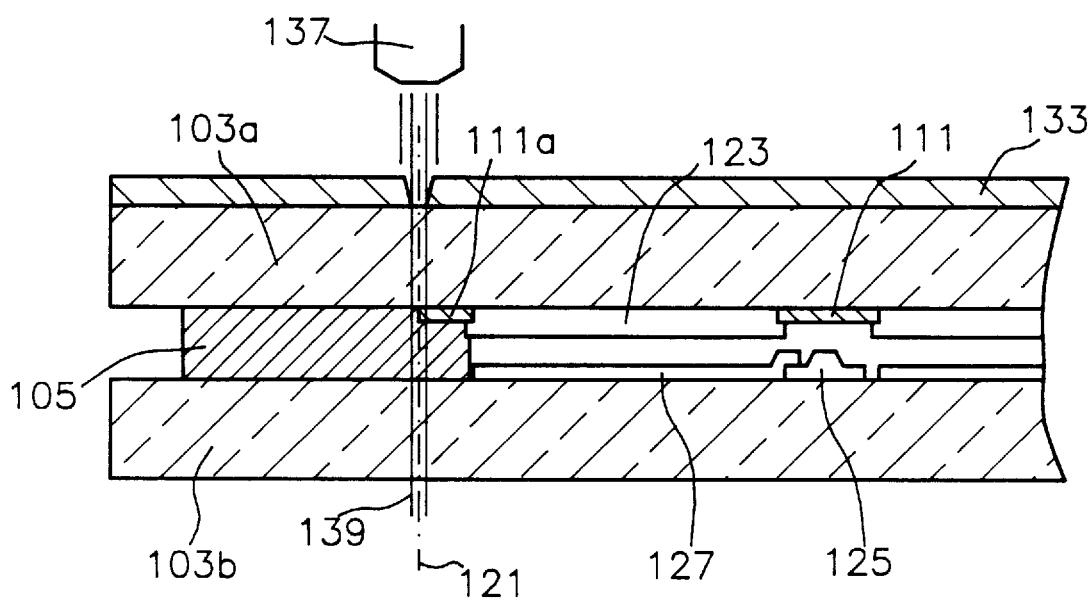
FIG. 15B is an enlarged cross-sectional view showing the seventh preferred method of cutting the seam parts in FIG. 7A according to the present invention.

Another preferred embodiment of the present invention is shown in FIGS. 14A and 14B. In this embodiment, the substrate are cut along the cutting line 121 by a laser beam having a very small cross-section. Here, an etch protector 131 is not needed. However, if the cross-section of the laser beam is not as small as desired, a laser beam protector 133 may be coated on one of the substrates with a notch having a desired cross-section at the cutting line. Then, the substrates are cut by applying the laser beam 139 at the notch, as shown in FIGS. 15A and 15B. Here, the laser beam protector 133 includes a metal, such as Cr, which can reflect the laser beam 139. The wavelength of the laser beam is preferably about 100 nm to 400 nm.

Figure 16:
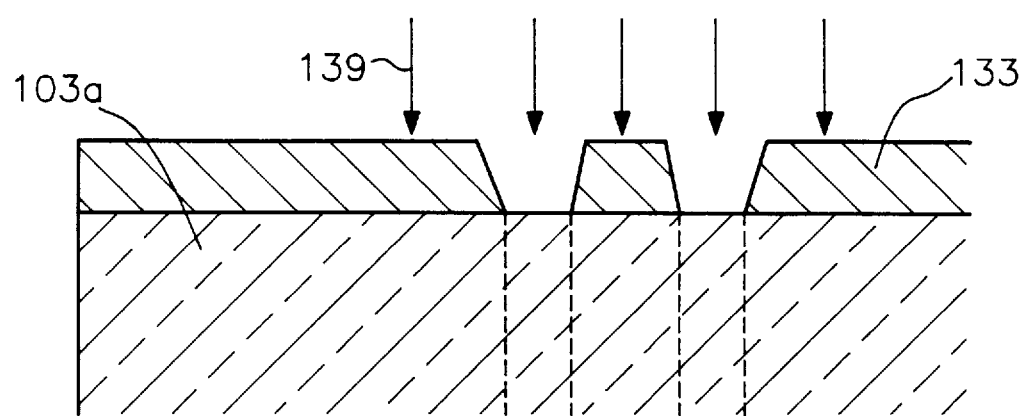
FIG. 16 is an enlarged cross-sectional view showing the eighth preferred method of cutting the seam parts by using laser according to the present invention.

Another embodiment of the present invention is shown in FIG. 16. In this embodiment, after the laser beam protectors 133 are coated thicker than about 2000 Å with opening parts (notches) at the cutting line, a laser beam protecting portion is formed at the middle of the opening parts (FIG. 16). As the laser beam 139 is applied as shown in FIG. 16, the applied part becomes hardened and others are not. As a result, the glass substrates attain phase differences 141. Then, the panels are cut along this part by etching or mechanical means, for example.

Figure 17A:
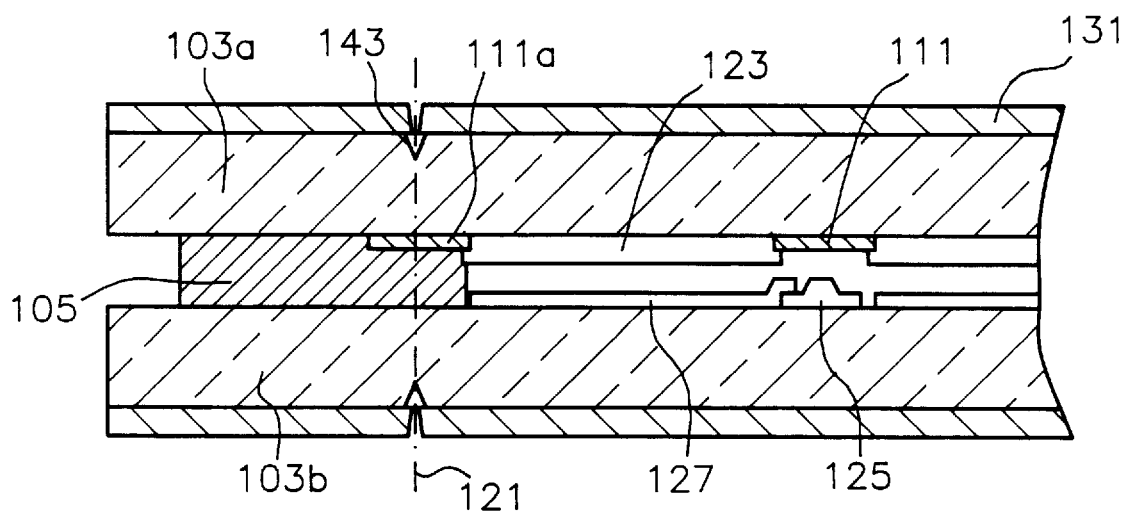
FIG. 17A is an enlarged cross-sectional view showing the ninth preferred method of cutting the seam parts in FIG. 6A according to the present invention.
Figure 17B:
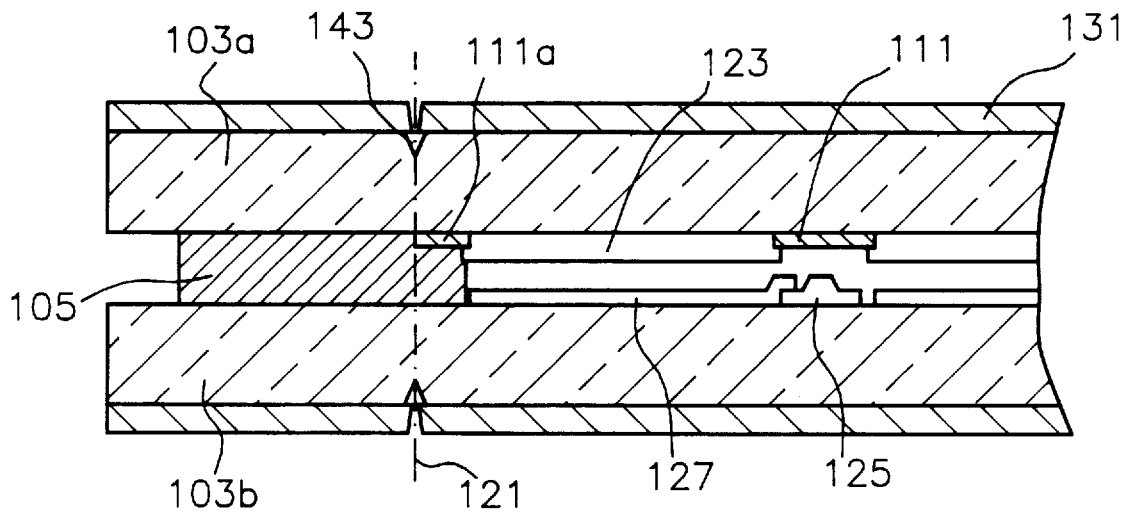
FIG. 17B is an enlarged cross-sectional view showing the ninth preferred method of cutting the seam parts in FIG. 7A according to the present invention.

Another embodiment of the present invention is shown in FIGS. 17A and 17B. In this embodiment, when the cutting is performed by mechanical means or laser beam, this method uses pre-cut parts formed by removing a portion of the substrate along the cutting line. To make the pre-cut parts 143 precise, etching protectors 131 are coated on the substrates with an opening (notch) at the cutting line. Then, the substrate at the opening is etched to from the pre-cut parts 143. To form the pre-cut parts 143 in a V-shape, dry etching is more preferable to wet etching.

Accordingly, the present invention makes it possible to tile the LCD panels of 10-inch to 14-inch, for example, that are too small for tiling by conventional methods. The present invention is easily applied to make high-density, large area LCD panels with a diagonal size of 38-inch to 44-inch by tiling LCD panels which have the diagonal size of 16-inch to 22-inch, for example.

Moreover, the present invention offers better quality displays by tiling several LCD panels on the same plane with no visible or noticeable seam parts by using techniques to precisely form the seams of the tiled panels. Since the present invention may use conventional LCD panels, it is easily applicable to manufacturing high density television (HDTV). For example, a 20-inch SVGA LCD panel having one million two-hundred thousand (1.2M) dots can be made by tiling four 10-inch. VGA LCD panels having three hundred thousand (300K) dots each in accordance with the present invention. Also, a high-density, large area LCD panel satisfying the specification of HDTV with one million nine-hundred thousand (1.9M) dots can be made by tiling four SVGA LCD panels having four hundred eighty thousand (480K) dots each.

Accordingly, the present invention allows for a high-density display in large area LCDs. Additionally, compared with the case of manufacturing 20-inch LCD panels having one million two-hundred thousand (1.2M) dots, for example, the yield of the present invention is greatly improved while the production cost is substantially reduced.

It will be apparent to those skilled in the art that various modifications and variations can be made in the high-density liquid crystal display and method of the present invention without departing from the spirit or scope of the invention. Thus, it is intended that the present invention cover the modifications and variations of this invention provided they come within the scope of the appended claims and their equivalents.

What is claimed is:

1. A method for manufacturing a display including first and second substrates, each having an inner light shielding region and an edge light shielding region, the method comprising the steps of:

defining the edge light shielding region into a first portion and a second portion;

defining an area of the first substrate, t he area including the first portion of the edge light shielding region;

removing the area including the first portion of the edge light shielding region and leaving the second portion of the edge light shielding region; and combining the first and second substrates at the second portion of the edge light shielding region.

2. The method according to claim 1, wherein the step of removing includes the step of etching the area.

3. The method according to claim 2, wherein the step of etching the area includes wet etching using one of an HF etchant, an (HF+NH$_4$F) etchant, and buffered oxide etchant.

4. The method according to claim 2, wherein the step of etching the area includes dry etching using one of (CF$_4$+O$_2$), (SF$_6$+O$_2$), and (CF$_4$ +SF$_6$+O$_2$) as an etchant.

5. The method according to claim 1, further comprising the step of planarizing a nonuniform portion after the removing step.

6. The method according to claim 1, wherein the step of removing the area includes the steps of:

removing a portion of the defined area before removing the entire defined area; and removing a remaining portion of the defined area.

7. The method according to claim 1, wherein the step of removing includes the steps of:

forming a protective layer on the first substrate; and etching the area.

8. The method according to claim 1, wherein the step of removing includes the steps of:

forming a protective layer on the first substrate; and cutting the area.

9. The method according to claim 8, wherein the step of cutting the area includes the steps of:

removing a portion of the protective layer to form a pre-cut portion in the protective layer above a border between the first and second portions of the edge light shielding region; and applying a force on the area to removing the area corresponding to the pre-cut portion.

10. The method according to claim 9, wherein the step of cutting the area further includes the step of etching a portion of the substrate corresponding to the pre-cut portion of the protective layer.

11. The method according to claim 1, wherein the step of removing includes the steps of:

forming a protective layer on the first substrate; and removing the area by a laser beam.

12. The method according to claim 11, wherein the step of removing the area by the laser beam includes the step of using a laser beam having a wavelength in a range of approximately 100–400 nm.

13. The method according to claim 11, wherein the step of removing the area by the laser beam includes the step of forming a notch in the protective layer over a border between the first and second portions of the edge light shielding region, the notch being formed to have a dimension smaller than a dimension of the laser beam.

14. The method according to claim 1, wherein the step of removing the area includes the steps of: forming a protective layer over the first substrate;

applying a laser beam onto the protective layer; and etching the area.

15. The method according to claim 1, wherein the step of removing the area includes the steps of:

forming a protective layer over the first substrate;

applying a laser beam onto the protective layer; and cutting the area.

16. The method according to claim 1, wherein the step of removing the area includes the step of forming a protective layer over the first substrate.

17. The method according to claim 16, wherein the step of forming the protective layer forms the protective layer over the first substrate up to a border between the first portion and the second portion of the edge light shielding region.

18. The method according to claim 16, wherein the step of forming the protective layer forms the protective layer over the first substrate and covering the first and second portions of the edge light shielding region.

19. The method according to claim 1, wherein the edge light shielding portion has a first width and the inner light shielding portion has a second width.

20. The method according to claim 19, wherein the first width is substantially the same as the second width and the step of removing the area includes removing about one-half of the width of the edge light shielding portion.

21. The method according to claim 19, wherein the first width is about one-half of the second width and the area removed by the removing step does not include the edge light shielding portion.

22. The method according to claim 1, wherein the step of combining the first and second substrates includes the step of joining the first and second substrates by tiling.

23. The method according to claim 1, further comprising the steps of forming a sealant having inner and outer end portions attached to the first substrate, the inner end portion extending over to the first and second portions of the edge light shielding region.

24. The method according to claim 1, wherein the outer end portion of the sealant is formed to be flush with the first substrate.

25. The method according to claim 1, wherein the outer end portion of the sealant is formed such that the first substrate extends past the outer end portion of the sealant.

26. A method for manufacturing a display including first and second substrates, each having an inner light shielding region and an edge light shielding region, the method comprising the steps of:

defining a first edge light shielding region of the first substrate into a first portion and a second portion;

defining a first area of the first substrate, the first area including the first portion of the first edge light shielding region;

removing the first area including the first portion of the first edge light shielding region and leaving the second portion of the first edge light shielding region;

defining a second edge light shielding region of the second substrate into a first portion and a second portion;

defining a second area of the second substrate, the second area including the first portion of the second edge light shielding region;

removing the second area including the first portion of the second edge light shielding region and leaving the second portion of the second edge light shielding region; and combining the first and second substrates.

* * * * *